US006438651B1

United States Patent
Slane

(10) Patent No.: US 6,438,651 B1
(45) Date of Patent: Aug. 20, 2002

(54) METHOD, SYSTEM, AND PROGRAM FOR MANAGING REQUESTS TO A CACHE USING FLAGS TO QUEUE AND DEQUEUE DATA IN A BUFFER

(75) Inventor: Albert Alfonse Slane, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/432,044

(22) Filed: Nov. 1, 1999

(51) Int. Cl.[7] .......................... G06F 13/14; G06F 12/00
(52) U.S. Cl. ...................... 711/118; 711/110; 711/144; 710/39; 710/52; 710/54
(58) Field of Search ................................ 711/110, 109, 711/133, 134, 135, 136, 137, 141, 144, 118; 710/39, 52, 53, 54, 55, 56, 57

(56) References Cited

U.S. PATENT DOCUMENTS

| | | | |
|---|---|---|---|
| 5,502,833 A | | 3/1996 | Byrne et al. ................ 711/132 |
| 5,537,552 A | * | 7/1996 | Ogasawara et al. ........... 365/73 |
| 5,682,513 A | * | 10/1997 | Candelaria et al. .......... 711/113 |
| 5,923,900 A | | 7/1999 | Soell et al. .................... 710/40 |
| 5,940,864 A | * | 8/1999 | Arimilli et al. ............. 711/144 |
| 5,996,049 A | * | 11/1999 | Arimilli et al. ............. 711/141 |
| 6,032,228 A | * | 2/2000 | Islam et al. ................. 711/133 |
| 6,141,733 A | * | 10/2000 | Arimilli et al. ............. 711/144 |

OTHER PUBLICATIONS

Andrew S. Tanenbaum, "Structured Computer Organization" ©1976, 1984 and 1990, pp. 209–215, Cache Memory.

* cited by examiner

*Primary Examiner*—Glenn Gossage
(74) *Attorney, Agent, or Firm*—Konrad Raynes Victor & Mann LLP

(57) ABSTRACT

Provided is a system, method, and program for managing read and write requests to a cache to process enqueue and dequeue operations for a queue. Upon receiving a data access request to a data block in a memory, a determination is made as to whether any data block is maintained in a cache line entry in the cache. If so, a cache line entry maintaining the data block is accessed to perform the data access request. A first flag, such as a read flag, associated with the accessed cache line entry is set "on" if the data access request is a read request. Further, if the data access request is a write request to update the data block in the memory, a second flag, such as a write flag, associated with the cache line entry including the data to update may be set "on". The update data may be data to be enqueued onto a queue, where the queue may be, but is not limited to, a circular buffer in the memory having a head and tail pointer. Still further, a cache line having each first flag set "on" and each second flag set "on" may be selected if there is no cache line having each first flag set "on" and each second flag set "off", and entries in the selected cache line having their second flag set "on" may be flushed.

33 Claims, 6 Drawing Sheets

METHOD, SYSTEM, AND PROGRAM FOR MANAGING REQUESTS TO A CACHE USING FLAGS TO QUEUE AND DEQUEUE DATA IN A BUFFER

BACKGROUND OF THE INVENTION

1. Field of the Invention

The present invention relates to a method, system, and program for managing a cache and, in particular, managing read and write requests to a cache to process enqueue and dequeue operations with respect to a queue.

2. Description of the Related Art

In communication devices, such as Asynchronous Transfer Mode (ATM) and other devices, different processes need to sequentially access data in real-time streaming. Circular buffers are data structures used to buffer data for such sequential data accessing. One process, referred to as the producer, places data in the circular buffer and another process takes data out of the buffer. Circular buffers may be used to buffer data transferred in either direction between a network communication link, such as an ATM switch, and a network node. The circular buffer includes a sequence of entries and a head entry and tail entry. New entries are added at the tail entry and data is accessed from the head entry. Whenever a new entry is added beyond the last possible entry in the circular buffer, a wrap-around occurs, which means that the latest entries are stored in the first entry of the circular buffer.

FIG. 1 shows a circular buffer in an "empty" state 2, a "partially full" state 4, and a full state 6. The circular buffer contains entries storing consecutive data blocks in the memory and a head pointer 6 and tail pointer 8. Circular buffers are used for accessing data blocks at sequential memory addresses. Circular buffers typically operate under a FIFO (first in first out) scheme, where the oldest data in the circular buffer is dequeued from the head 6 and new data is added or enqueued to the tail 8. When a new entry is enqueued at the tail 8, the tail 8 is incremented to again point to the next available entry position.

The head 6 points to the oldest entry in the circular buffer. The entry pointed to by the head 6 is dequeued as in a FIFO arrangement, the oldest entry is removed before any later added entries. After dequeuing the entry at the head 6, the head is incremented to point to the next oldest entry which would comprise the data block in memory logically following the data block dequeued.

The circular buffer 4 is partially filled. The tail 8 points to the next available free entry and the head 6 points to the oldest entry in queue 4. As an entry is added at the tail 8 of the queue 4, the tail 8 moves downward to point to the next free entry and, as an entry is removed, the head 6 moves downward to point to the next oldest entry in the queue following the dequeued entry. When adding and removing entries, the circular buffer moves forward in a circular worm-like manner, where the circle may expand and contract depending on how data is added and removed.

In the full buffer 6, the head 6 and tail 8 point to the same entry. In preferred embodiments, a full/not full flag indicates whether a queue is full. The full buffer 6 has its full flag set to 1 or "on."

Although circular queues such as the one shown above, as well as other implementations of circular queues, are known in the art, there is a need to provide improved methods for accessing the data in the queues.

SUMMARY OF THE PREFERRED EMBODIMENTS

Preferred embodiments disclose a method, system, and program for managing a cache. Upon receiving a data access request to a data block in a memory, a determination is made as to whether the requested data block is maintained in a cache line entry in the cache. If so, the determined cache line entry is accessed to perform the data access request. A first flag associated with the accessed cache line entry is set "on" if the data access request is a read request.

In embodiments where the data access request is a write request to update the requested data block in the memory, the update data to the data block is written to the cache line entry including the data to update when accessing the determined entry in the cache line. A second flag associated with the accessed cache line entry is set "on" to indicate that the entry was subject to a write hit.

In further embodiments, the entries in the cache line may be flushed to the memory if the second flag for each entry is set "on".

In still further embodiments, each cache line includes a valid flag set "on" if the cache line includes data from the memory and set "off" if the cache line does not include data from the memory. One cache line having its valid flag set "off" is selected if the requested data block is not maintained in one cache line entry. Consecutive data blocks are fetched from the memory including the requested data block to access if the requested data block is not maintained in one cache line entry and written to the selected cache line.

In yet further embodiments, one cache line having its valid flag set "on" and the first and second flags for each entry set "off" is selected if no cache line has its valid flag set "off". Alternatively, one cache line having its valid flag set "on", the first flag for each entry set "off", and the second flag for each entry set "on" is selected if no cache line has its valid flag set "on" and the first and second flags for each entry set "off". The selected cache line is flushed to the memory if the selected cache line has each second flag set "on" before writing the fetched consecutive data blocks to the selected cache line.

Preferred embodiments of the present invention include a cache management scheme that optimizes read and write hits for queues having data that is accessed in a consecutive manner, such as a circular buffer queue. By maintaining consecutive data addresses from the memory in a cache line, read and write hits are assured as each subsequent read/dequeue and write/enqueue request to the circular buffer queue is to a next consecutive address in the memory. If a cache line includes n consecutive data blocks in memory, then the next n access requests to the queue will have hits to the cache after the n data blocks are staged into the n entries in the cache line.

In preferred embodiments, flags are added to the cache to ensure that cache lines currently being accessed by requests to the circular buffer are not selected for replacement. A cache line is currently being accessed if there are entries in the cache line that have not been accessed during access operations to the circular buffer. This optimizes cache access because such lines that have not had every entry accessed still have further entries that will be requested during subsequent access requests to the queue, which for circular buffers are to the next subsequent data blocks in memory.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
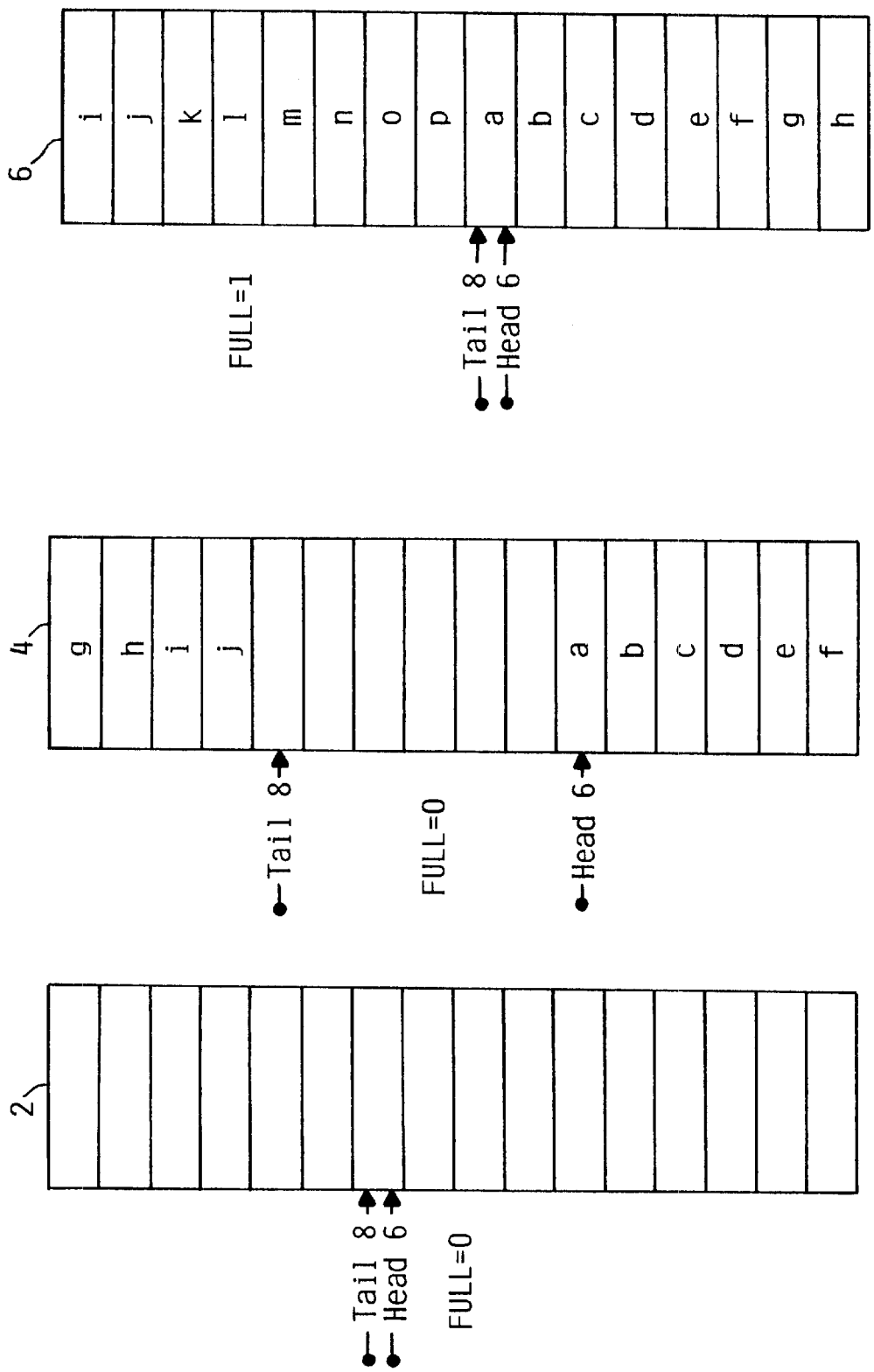
FIG. 1 illustrates a circular queue buffer data structure known in the art.
Figure 2:
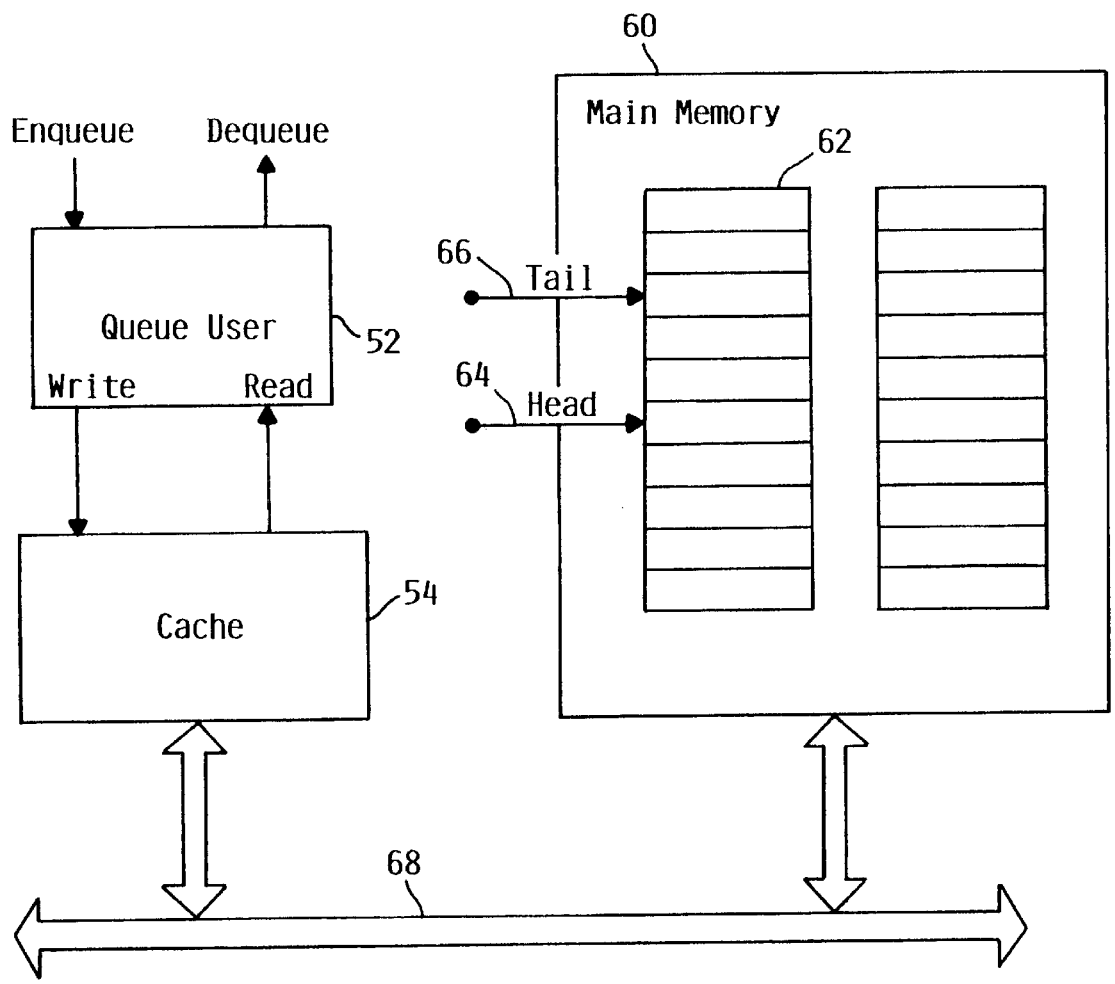
FIG. 2 illustrates a computing environment with an arrangement of a cache and memory device including a circular buffer in which preferred embodiments of the present invention are implemented.

FIG. 2 illustrates a computing environment with an arrangement of a cache and memory device including a circular buffer in which preferred embodiments are implemented. The computing environment includes a queue user 52, which may comprise a processor unit, CPU, hardware, etc., and a cache 54. The cache 54 would include a directory of the data stored in cache, data, and control logic to use the directory to access entries in cache. A main memory 60 may be comprised of any volatile memory device known in the art, such as a Dynamic Random Access Memory (DRAM), Static Random Access Memory (SRAM), Random Access Memory (RAM), etc. The main memory 60 includes a circular buffer data structure 62 having head and tail pointers 64 and 66 in a manner known in the art. As shown, the main memory 60 may include multiple circular buffers accessible to the queue user 52. To access data from the main memory 60, the cache 54 must access the data via a bus 68 or memory read/write interface in a manner known in the art. The cache 54 would store data blocks in the memory included in the circular buffer 62 to provide the queue user 52 faster access to the data in the circular buffer 62 than can be provided from the main memory 60. Entries from the circular buffer 62 are staged into the cache 54.

As shown in FIG. 2, the queue user 52 performs enqueue and dequeue operations to the queue 62. The enqueue operation places new data at the tail 66 of the queue 62 and therefore does a memory write. The dequeue operation removes data from the head 64 of the queue 62, and therefore does a memory read. These memory reads and writes are presented to the cache 54 to fulfill. The cache 54 remains transparent to the queue user 52 that performs enqueue/dequeue operations to the circular buffer 52, which are translated into read/write operations to the cache 54. In this way, an entity that wants to access, i.e., read/dequeue or write/enqueue, data to the circular buffer 62, would request the data and the queue user 52 would return the data from the cache 54 much faster than the process of accessing and returning the data from the main memory 62 over the bus 68. For instance, the queue user 52 and main memory 60 may be buffering data packets transmitted between network communication devices or adaptors within a personal computer, or maintaining an event queue.

Figure 3:
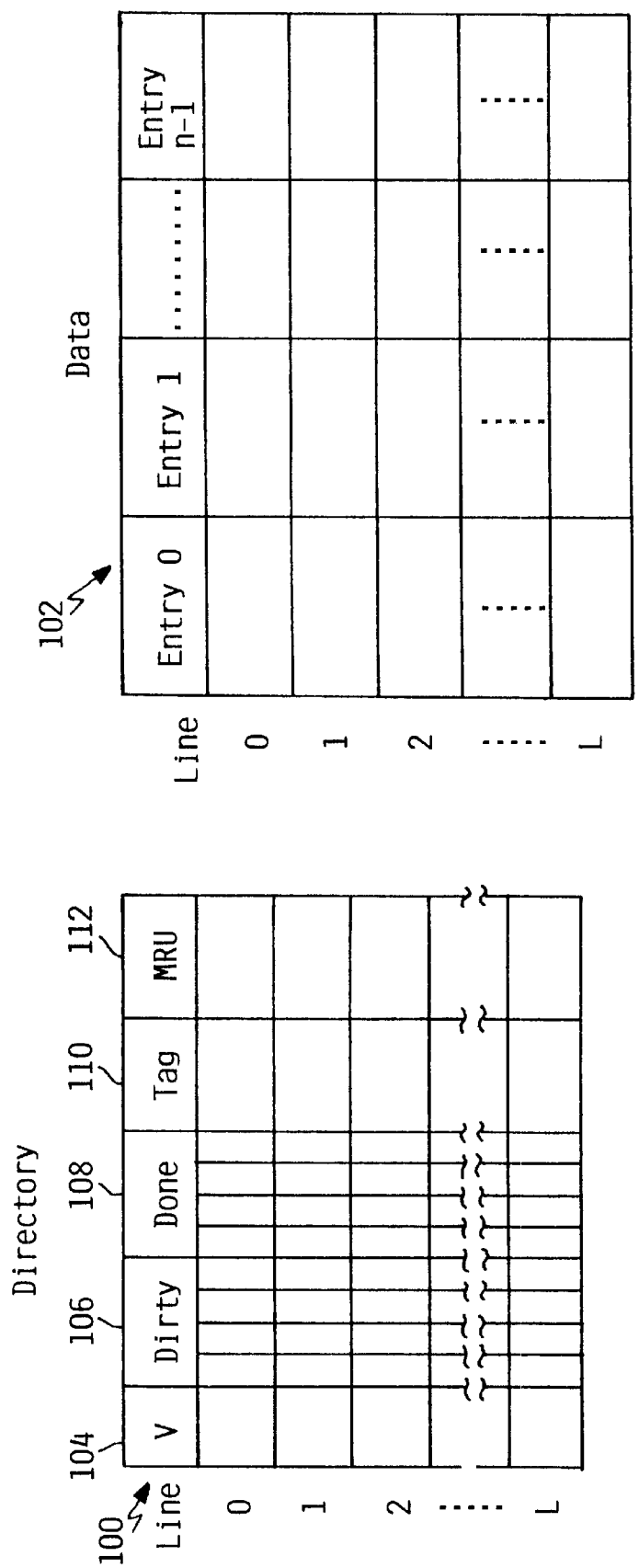
FIG. 3 illustrates a set associative cache in accordance with preferred embodiments of the present invention.

FIG. 3 illustrates details of the cache 54, which, in preferred embodiments, is implemented as a set associative cache. The cache 54 includes a directory portion 100 and data portion 102. The data portion 102 has n entries of data from the main memory 60 per line in the cache 54. The directory portion 100 includes flags and other control information for the corresponding line in cache. Each line includes a valid flag 104, a dirty or write flag 106 for each entry in the line, a done or read flag 108 for each entry in the line, a tag 110, and an MRU value 112. The MRU value is a most recently used indicator for each entry line, indicating which line is the most recently used. The valid flag 104 indicates whether the line has a valid sequence of data blocks from the main memory 60, i.e., whether the line is in use. If the flag is set "off", then the line does not currently have any valid data from the main memory 60. Each entry in a cache line includes a dirty or write flag 106 and a done flag 108. The dirty flag 106 indicates whether a corresponding entry has been updated with new data since the data was staged into the cache 54, i.e., the entry had a write hit. A done flag 108 indicates whether an entry was read after it was staged into cache, i.e., the entry had a read hit. The tag field 110 includes part of the main memory address to allow the cache 54 to determine the address in the main memory 60 that the entry in cache 54 maintains in a manner known in the art. The MRU field 112 includes an ordering value used to determine when to destage an entry from cache 54 as part of a most recently used (MRU) algorithm for destaging data from cache 54. Each entry includes the data in the main memory address. Each entry has a fixed size. For instance, if the data entry size of data staged into cache 54 from the main memory 60 is 16 bits and the cache line size was 64 bytes, then there would be 32 dirty and done bits.

Figure 4:
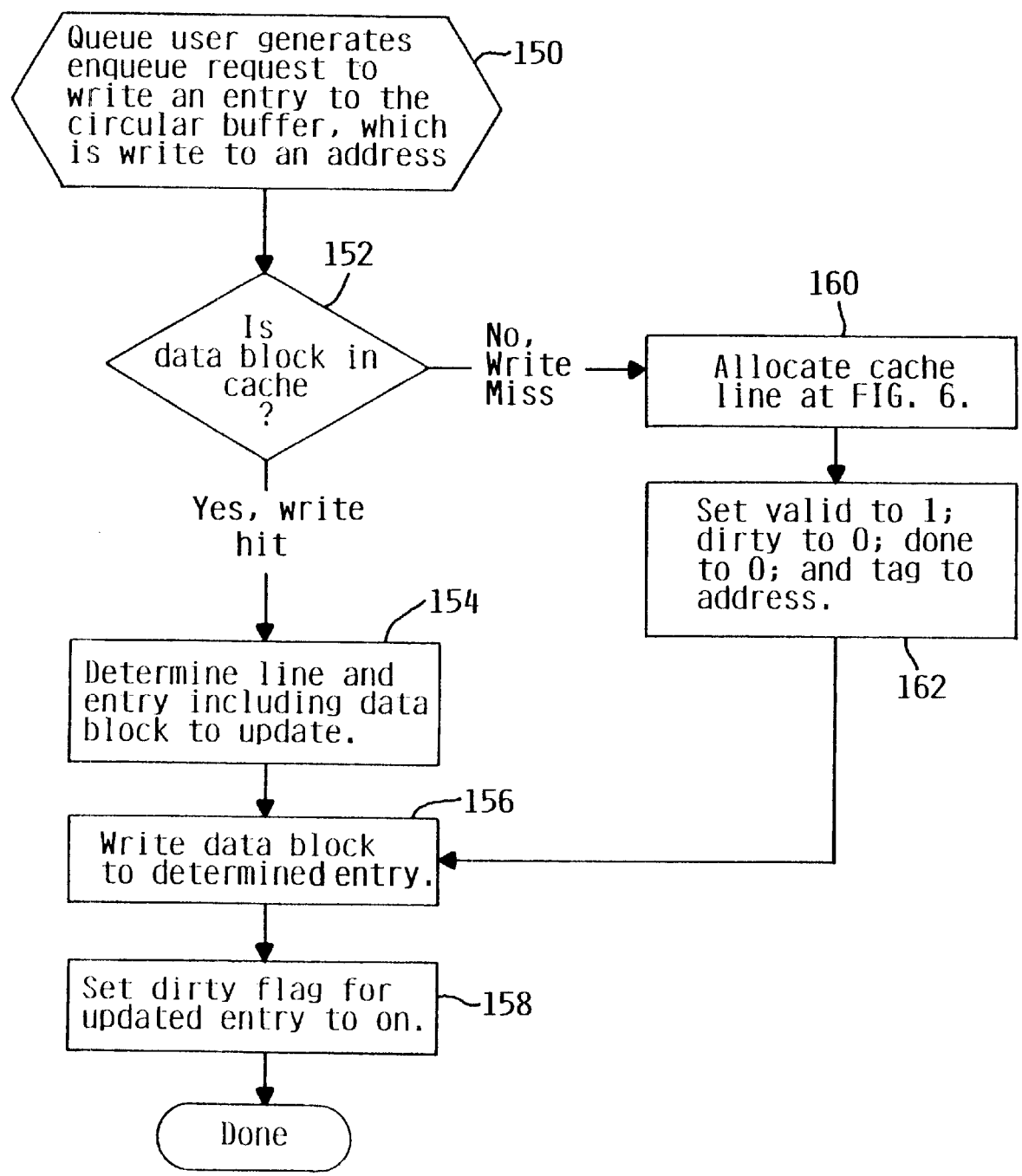
FIG. 4 illustrates a flowchart for processing write requests to the circular queue in memory with respect to the cache in FIG. 3 in accordance with preferred embodiments of the present invention.
Figure 5:
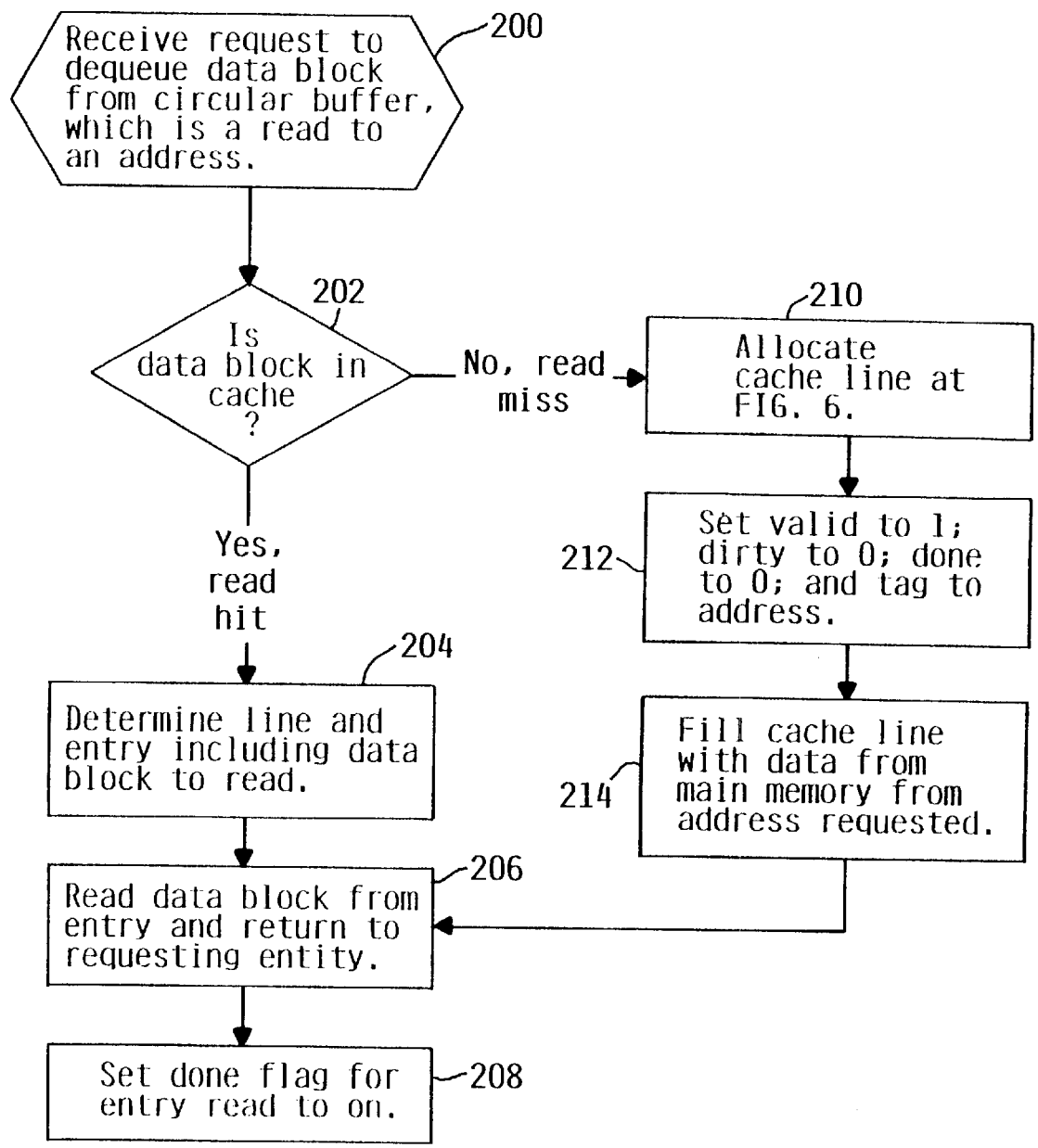
FIG. 5 illustrates a flowchart for processing read requests to the circular queue in memory with respect to the cache in FIG. 3 in accordance with preferred embodiments of the present invention.
Figure 6:
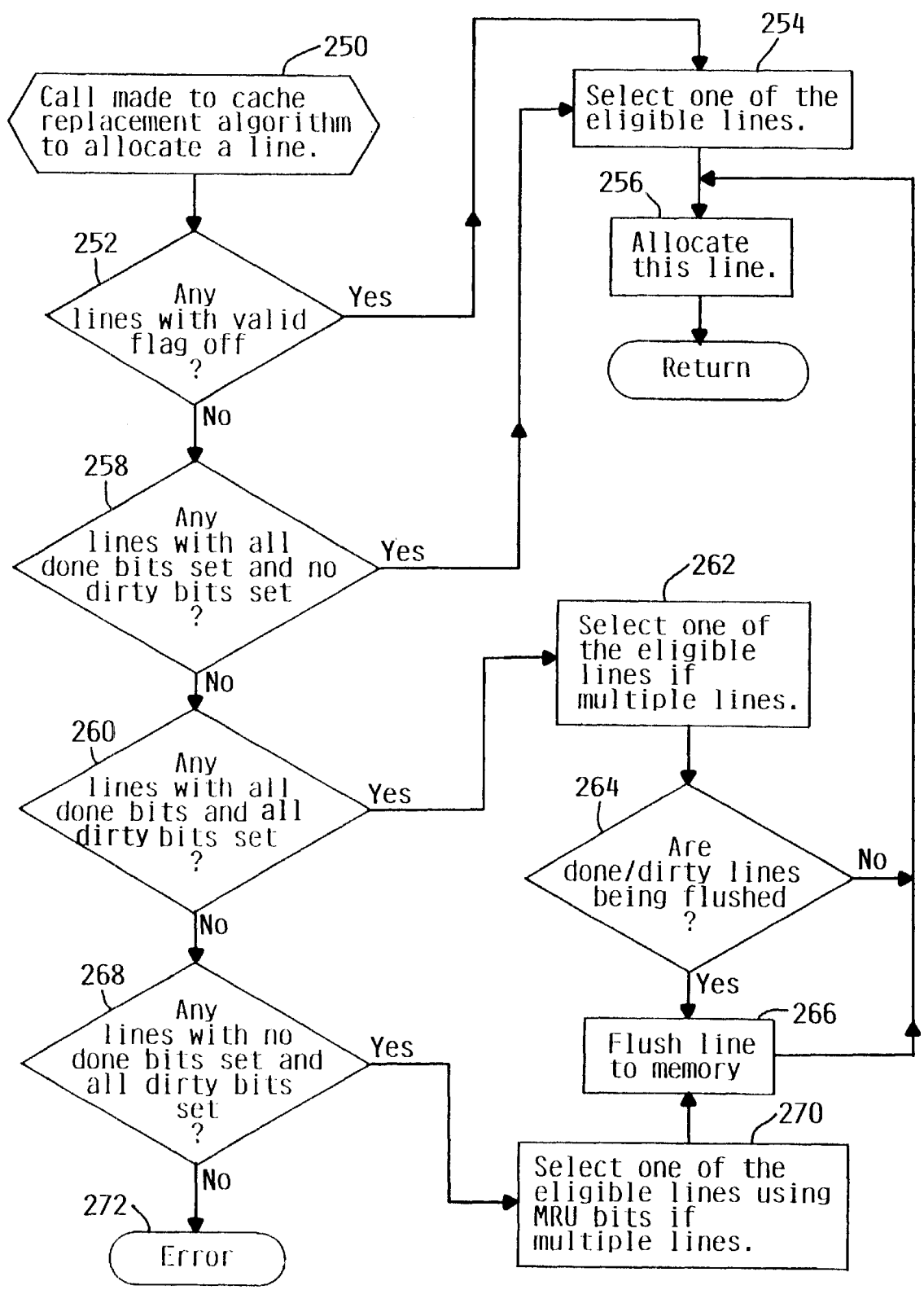
FIG. 6 illustrates a flowchart for a replacement strategy to select a cache line to add fetched data in accordance with preferred embodiments of the present invention.

Entities accessing the circular buffer 62 add entries by enqueuing data to the buffer 62 and access the buffer 62 by dequeuing data. As discussed, data is added at the tail pointer 66 and removed or accessed from the head 64 of the queue. The data in a circular buffer are same sized blocks of data at consecutive addresses in the main memory 60. Thus, by providing the addresses for the head and tail pointers 64 and 66, the entry in the queue including a block of data can be determined from the head 64 and tail pointers 66. When entries are enqueued or added to the circular buffer 62, the data is then written to cache 54. Because the data structure is a circular buffer, dequeue requests will be for data at the head 64 and enqueue requests will be for a data block at the tail 66 following the most recently added data block to the circular buffer 62. If data is dequeued or accessed from the circular buffer 62, then it is read from cache 54. If more than one line or slot in the cache 54 is allocated to each circular buffer 62, then there must be a cache replacement policy to select a line to use if the current lines contain valid entries FIGS. 4, 5, and 6 illustrate logic implemented in the cache 54 to manage the cache 54 to optimize cache hits during enqueue and dequeue operations to the circular buffer 52. As discussed, a dequeue operation accesses the oldest entry in the buffer 62, pointed to by the head 64, and an enqueue operation adds a data block following the most recently added data block, at the entry pointed to by the tail 66.

FIG. 4 illustrates logic executed by the cache 54 to handle an enqueue request to add data to the circular buffer 62. Control begins at block 150 with the queue user 52 generating an enqueue request to write an entry to the circular buffer 62. An enqueue request translates to a write operation.

The cache 54 determines (at block 152) whether the data block to update is in cache 54. If so, i.e., there is a write hit, then the cache 54 determines (at block 154) the line and entry in cache 54 including the data block to update and writes (at block 156) the data to the determined entry. The cache 54 then sets (at block 158) the dirty flag 106 "on" for the entry updated in the cache 54 to indicate that the entry includes updated data. If the data block to update is not in cache 54 (at block 152), i.e., write miss, then the cache 54 allocates (at block 160) a line to cache according to the algorithm in FIG. 6, where the line includes entries for consecutive blocks in the main memory 60, starting from the data block to update. For the line just allocated, the cache 54 then sets (at block 162) the valid flag 104 to 1, the dirty flags 106 to 0, the done flags 108 to 0, and the tag 110 to the address in main memory 60 of the first entry read into the cache line. From block 162, control proceeds to block 156 to process the write/enqueue request. FIG. 4 illustrates logic executed by the cache 54 to handle an enqueue request to add data to the circular buffer 62. Control begins at block 150 with the queue user 52 generating an enqueue request to write an entry to the circular buffer 62. An enqueue request translates to a write operation. The cache 54 determines (at block 152) whether the data block to update is in cache 54. If so, i.e., there is a write hit, then the cache 54 determines (at block 154) the line and entry in cache 54 including the data block to update and writes (at block 156) the data to the determined entry. The cache 54 then sets (at block 158) the dirty flag 106 "on" for the entry updated in the cache 54 to indicate that the entry includes updated data. If the data block to update is not in cache 54 (at block 152), i.e., write miss, then the cache 54 allocates (at block 160) a line to cache according to the algorithm in FIG. 6, where the line includes entries for consecutive blocks in the main memory 60, starting from the data block to update. For the line just allocated, the cache 54 then sets (at block 162) the valid flag 104 to 1, the dirty flags 106 to 0, the done flags 108 to 0, and the tag 110 to the address in main memory 60 of the first entry read into the cache line. From block 162, control proceeds to block 156 to process the write/enqueue request.

FIG. 5 illustrates logic executed by the cache 54 to process a request to dequeue/read a data block from the circular buffer 62. Control begins at block 200 with the cache 54 receiving the read/dequeue request. If the requested data block is in cache 54 (at block 202), then the cache 54 determines (at block 204) the line and entry in cache 54 including the data block to read. The cache 54 reads (at block 206) the data block from the determined entry in cache 54 and returns the data to the requesting entity. The done flag 108 for the entry just read is set (at block 208) to "on". If the requested data block is not in cache 54 (at block 202), i.e., read miss, then the cache 54 allocates (at block 210) a line to cache according to the algorithm in FIG. 6, and fetches consecutive blocks from the main memory 60, including the requested data block, to add to the line in cache 54. For the line just allocated, the cache 54 then sets the valid flag 104 to 1, the dirty flags 106 to 0, the done flags 108 to 0, and the tag 110 to the address in main memory 60 of the first entry read into the cache line. The cache 54 then fills (at block 214) the cache line with data from the main memory 60 address requested. From block 214, after data is fetched from memory and written to a cache line, control proceeds to block 206 to process the read/dequeue request.

With the logic of FIGS. 4 and 5, a cache line used to service read requests includes the actual data from the main memory 60 to return to subsequent sequential read requests. However, for a line allocated to update operations, the data is not read into the cache line from main memory 60 because the data will eventually be overwritten during the sequential write/update operations. Thus, there is no need to actually prefetch and fill the line with data for lines allocated to the write operations. Furthermore, if there is overlap with the head line (i.e., when the tail approaches the head in the circular buffer), then the head line will already be loaded in cache 54.

FIG. 6 illustrates the replacement routine the cache 54 executes if the data to update/enqueue or read/dequeue is not included in a cache line. Control begins at block 250 with a call to the replacement algorithm to allocate a line to the read or write operation. The cache 54 first determines (at block 252) whether any lines have the valid flag "off," i.e., have no valid data from the main memory 60. If there is such a line, then the cache 54 selects (at block 254) and allocates (at block 256) one of those lines and returns to the place where the replacement algorithm was called to complete the read or write operation. If there are no lines having the valid flag "off" (at block 252), then the cache 54 next determines (at block 258) whether there are any lines with all the done bits 108 set and no dirty bits 106 set, i.e., all the entries in the line have been read, and no entries have received updates. If there is such a line, then the cache 54 proceeds to block 254 to select and allocate one of the eligible lines.

If there was no line valid with all done bits 108 set and no dirty bits 106 set (at block 258), then the cache 54 determines (at block 260) whether any line has all dirty and done bits 106 and 108 set. If so, then the cache 54 selects (at block 262) one of the eligible lines if there are multiple eligible lines. If done and dirty lines are being flushed (at block 264), then the entries in the line are flushed (at block 266) to main memory 60 and the line is allocated at block 256. Otherwise, if done and dirty lines are not flushed, then the line is allocated at block 256. Dirty entries may be flushed for diagnostic purposes to make the updates in the queue available for diagnostic purposes. However, during normal system operations, the data may not be flushed to minimize Input/Output (I/O) operations. The reason is that if all the entries have been read and updated, then no further process would need to access the queue entries.

If no lines have entries with all done and dirty bits 108 and 106 (at block 260), then the cache 54 determines (at block 268) whether there are any lines with no done bits 108 and all dirty bits 106 set. If there are one or more lines with no done bits set and all dirty bits set, then one of the eligible lines is selected (at block 270). If there are multiple lines, then the line having the lowest MRU 12 value is selected for allocation. Because the updated or dirty data has not yet been read, the entries in the line are flushed (at block 266) before being allocated (at block 256).

If there are at least two lines per queue, one line for read/dequeue operations and one for write/enqueue operations, then a line will always be allocated from blocks 252, 258, 260 or 268.

The preferred replacement strategy does not use any lines that have entries with some done bits set "off", i.e., entries that have had not had a read hit. The reason for this is that when accessing a circular buffer 62, the next dequeue or read requests will be to consecutive entries in the cache line that have not been read. Thus, it is optimal to keep the line with unread entries in cache 54 to make the line available for future sequential dequeue/read requests. The replacement strategy further prefers a line having no dirty bits set than having all dirty bits set. A line with no dirty bits set may be accessed faster for storing data fetched from main memory 60 as the data in the line does not have to be flushed before the line is used to cache data from the main memory 60.

In the preferred embodiments, at least two lines are allocated per queue, one for the enqueue/write operations and the other for dequeue/read operations. When the queue is small, a single line is adequate, but two lines are necessary as a queue grows because a cache line is needed for both the head and tail portions of the queue. For both the read and write processes, the cache lines are accessed in a sequential fashion from entry 0 to entry N−1 in a particular cache line L. This behavior is what enables the optimal behavior of the cache and cache replacement policy. In the worst case, each line will have a single cache miss followed by N−1 cache hits in both the read and write processes.

The preferred cache embodiment is particularly optimal for caching circular buffers 62 because the consecutive data blocks in main memory 60 are made available in cache 54 for the next n enqueue or dequeue operations. Thus, the preferred embodiments reduce the likelihood of misses for each entry in the cache line including data blocks from the circular buffer 62. After each entry in the cache line has been subject to a dequeue/read or enqueue/write operation, the next n consecutive data blocks that will be subjected to the next n circular buffer 62 access operations are fetched into the cache line selected according to the replacement strategy described with respect to the above discussed replacement strategy to be available for the next n access operations.

CONCLUSIONS AND ALTERNATIVE EMBODIMENTS

This concludes the description of the preferred embodiments of the invention. The following describes some alternative embodiments for accomplishing the present invention. The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

The preferred cache data structure was described as optimal for caching entries in a circular buffer. However, the cache data structure and replacement strategy of the preferred embodiments may be utilized for queues and data structures other than the circular buffer data structure.

The preferred embodiment was described as implemented in a set associative cache. However, those skilled in the art will appreciate that other cache implementations could be used, including a direct mapped, fully associative cache and other cache designs known in the art.

In further embodiments, a single cache 54 may allocate different lines to different circular buffers 62 in the main memory 60. Preferably if there are multiple queues, then it is desirable to use the same cache 54 for all queues so that only one interface to memory 60 and one interface to cache 54 needs to be used for all the queues.

Preferred embodiments were described with respect to setting the flags to an "on" or "off" value, i.e., binary 1 or 0, respectively. However, the use of the terms "on" and "off" refers to any values for which the flags may be set indicating a particular state of an entity in the system. In this way, reference to "on" and "off" indicates a particular state and not any particular binary or other value which may be used to electronically represent the state.

Preferred embodiments were described with respect to an on-board CPU cache to cache data from a volatile memory device. However, in further embodiments, the cache may comprise a volatile memory device and the memory device having its data cached may comprise a non-volatile memory device or a slower volatile memory device.

In summary, preferred embodiments disclose a system, method, and program for managing a cache. Upon receiving a data access request to a data block in a memory, a determination is made as to whether the requested data block is maintained in a cache line entry in the cache. If so, the determined cache line entry is accessed to perform the data access request. A first flag associated with the accessed cache line entry is set "on" if the data access request is a read request.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing a cache, comprising:
   receiving a data access request to a requested data block in a memory;
   determining whether the requested data block is maintained in any cache line entry in the cache;
   accessing a cache line entry if the data block is maintained in that cache line entry to perform the data access request;
   setting a first flag associated with the accessed cache line entry "on" if the data access request is a read request;
   receiving a request to allocate one cache line; and
   selecting one cache line to allocate to the request based on a setting of the first flags for the cache line entries in the cache lines.

2. The method of claim 1, wherein the data access request is a read request to read the requested data block.

3. The method of claim 1, wherein each cache line includes a valid flag set "on" if the cache line includes valid data from the memory and set "off" if the cache line does not include valid data from the memory, further comprising:
   selecting one cache line that has its valid flag set "off" if the requested data block is not maintained in any cache line entry,
   fetching consecutive data blocks from the memory including the requested data block if that requested data block is not maintained in any cache line entry; and
   writing the fetched consecutive data blocks to the selected cache line.

4. The method of claim 1, wherein the data access request is a write request to update the requested data block in the memory, further comprising:
    writing update data to the requested data block in the accessed cache line entry when accessing that cache line entry; and
    setting a second flag associated with the accessed cache line entry "on", wherein a setting of the second flag for the cache line entries is considered in combination with the setting of the first flags when selecting one cache line to allocate.

5. The method of claim 4, further comprising receiving data to enqueue onto a queue in the memory, wherein the data access request is a write request to write the received data to the data block in the memory, and wherein the update data is the received data to enqueue.

6. The method of claims 5, wherein the queue is a circular buffer in the memory having a head pointer and a tail pointer.

7. The method of claim 6, wherein two cache lines are used to store data blocks in the circular buffer, wherein one cache line includes one data block adjacent to the head pointer and another cache line includes one data block adjacent to the tail pointer.

8. A method for managing a cache, comprising:
    receiving a data access request to a requested data block in a memory;
    determining whether the requested data block is maintained in any cache line entry in the cache, wherein each cache line includes a valid flag set "on" if the cache line includes valid data from the memory and set "off" if the cache line does not include valid data from the memory,;
    accessing a cache line entry if the data block is maintained in that cache line entry to perform the data access request;
    setting a first flag associated with the accessed cache line entry "on" if the data access request is a read request;
    selecting one cache line that has its valid flag set "off" if the requested data block is not maintained in any cache line entry;
    fetching consecutive data blocks from the memory including the requested data block if that requested data block is not maintained in any cache line entry;
    writing the fetched consecutive data blocks to the selected cache line;
    receiving a request to allocate one cache line if no cache line has the valid flag set "off"; and
    selecting one cache line to allocate to the request having each first flag set "on" and each second flag set "off".

9. The method of claim 8, further comprising:
    selecting one cache line having each first flag set "on" and each second flag set "on" if there is no cache line a having each first flag set "on" and each second flag set "off"; and
    flushing entries in the selected cache line having their second flag set "on".

10. The method of claim 9, further comprising selecting one cache line having each first flag set "off" and each second flag set "on" if there is no cache line having each first flag set "on".

11. The method of claim 10, wherein at least two cache lines are allocated to store data blocks in a circular buffer, wherein one cache line includes one data block adjacent to the head pointer and another cache line includes one data block adjacent to the tail pointer.

12. A system for managing a cache, comprising:
    a cache;
    means for receiving a data access request to a requested data block in a memory;
    means for determining whether the requested data block is maintained in any cache line entry in the cache;
    means for accessing a cache line entry if the data block is maintained in that cache line entry to perform the data access request;
    means for setting a first flag associated with the accessed cache line entry "on" if the data access request is a read request;
    means for receiving a request to allocate one cache line; and
    means for selecting one cache line to allocate to the request based on a setting of the first flags for the cache line entries in the cache lines.

13. The system of claim 12, wherein the data access request is a read request to read the requested data block.

14. The system of claim 12, wherein each cache line includes a valid flag set "on" if the cache line includes valid data from the memory and set "off" if the cache line does not include valid data from the memory, further comprising:
    means for selecting one cache line that has its valid flag set "off" if the requested data block is not maintained in any cache line entry;
    means for fetching consecutive data blocks from the memory including the requested data block if that requested data block is not maintained in any cache line entry; and
    means for writing the fetched consecutive data blocks to the selected cache line.

15. The system of claim 12, wherein the data access request is a write request to update the requested data block in the memory, further comprising:
    means for writing update data to the requested data block in the accessed cache line entry when accessing that cache line entry; and
    means for setting a second flag associated with the accessed cache line entry "on", wherein a setting of the second flag for the cache line entries is considered in combination with the setting of the first flags when selecting one cache line to allocate.

16. The system of claim 15, further comprising means for receiving data to enqueue onto a queue in the memory, wherein the data access request is a write request to write the received data to the data block in the memory, and wherein the update data is the received data to enqueue.

17. The system of claims 16, wherein the queue is a circular buffer in the memory having a head pointer and a tail pointer.

18. The system of claim 17, wherein two cache lines are used to store data blocks in the circular buffer, wherein one cache line includes one data block adjacent to the head pointer and another cache line includes one data block adjacent to the tail pointer.

19. A system for managing a cache, comprising:
    a cache;
    means for receiving a data access request to a requested data block in a memory;
    means for determining whether the requested data block is maintained in any cache line entry in the cache, wherein each cache line includes a valid flag set "on" if the cache line includes data from the memory and set "off" if the cache line does not include data from the memory;

means for accessing a cache line entry if the data block is maintained in that cache line entry to perform the data access request;

means for setting a first flag associated with the accessed cache line entry "on" if the data access request is a read request;

means for selecting one cache line that has its valid flag set "off" if the requested data block is not maintained in one cache line entry;

means for fetching consecutive data blocks from the memory including the requested data block to access if the requested data block is not maintained in one cache line entry;

means for writing the fetched consecutive data blocks to the selected cache line;

means for receiving a request to allocate one cache line;

means for selecting one cache line to allocate to the request based on a setting of the first flags for the cache line entries in the cache lines;

receiving a request to allocate one cache line if no cache line has the valid flag set "off"; and means for selecting one cache line to allocate to the request having each first flag set "on" and each second flag set "off".

20. The system of claim 19, further comprising:

means for selecting one cache line having each first flag set "on" and each second flag set "on" if there is no cache line having each first flag set "on" and each second flag set "off"; and means for flushing entries in the selected cache line having their second flag set "on".

21. The system of claim 20, further comprising means for selecting one cache line having each first flag set "off" and each second flag set "on" if there is no cache line having each first flag set "on".

22. The system of claim 21, wherein at least two cache lines are allocated to store data blocks in a circular buffer, wherein one cache line includes one data block adjacent to the head pointer and another cache line includes one data block adjacent to the tail pointer.

23. An article of manufacture for managing a cache, the article of manufacture comprising computer readable storage media including at least one computer program embedded therein that is capable of causing a processor to perform:

receiving a data access request to a requested data block in a memory;

determining whether the requested data block is maintained in any cache line entry in the cache;

accessing a cache line entry if the data block is maintained in that cache line entry to perform the data access request;

setting a first flag associated with the accessed cache line entry "on" if the data access request is a read request;

receiving a request to allocate one cache line; and selecting one cache line to allocate to the request based on a setting of the first flags for the cache line entries in the cache lines.

24. The article of manufacture of claim 23, wherein the data access request is a read request to read the requested data block.

25. The article of manufacture of claim 23, wherein each cache line includes a valid flag set "on" if the cache line includes valid data from the memory and set "off" if the cache line does not include valid data from the memory, further causing the processor to perform:

selecting one cache line that has its valid flag set "off" if the requested data block is not maintained in any cache line entry;

fetching consecutive data blocks from the memory including the requested data block if that requested data block is not maintained in any cache line entry; and writing the fetched consecutive data blocks to the selected cache line.

26. The article of manufacture of claim 23, wherein the data access request is a write request to update the requested data block in the memory, further causing the processor to perform:

writing update data to the requested data block in the accessed cache line entry when accessing that cache line entry; and setting a second flag associated with the accessed cache line entry "on", wherein a setting of the second flag for the cache line entries is considered in combination with the setting of the first flags when selecting one cache line to allocate.

27. The article of manufacture of claim 26, further causing the processor to perform receiving data to enqueue onto a queue in the memory, wherein the data access request is a write request to write the received data to the data block in the memory, and wherein the update data is the received data to enqueue.

28. The article of manufacture of claims 27, wherein the queue is a circular buffer in the memory having a head pointer and a tail pointer.

29. The article of manufacture of claim 28, wherein two cache lines are used to store data blocks in the circular buffer, wherein one cache line includes one data block adjacent to the head pointer and another cache line includes one data block adjacent to the tail pointer.

30. An article of manufacture for managing a cache, the article of manufacture comprising computer readable storage media including at least one computer program embedded therein that is capable of causing a processor to perform:

receiving a data access request to a requested data block in a memory;

determining whether the requested data block is maintained in any cache line entry in the cache, wherein each cache line includes a valid flag set "on" if the cache line includes valid data from the memory and set "off" if the cache line does not include valid data from the memory, accessing a cache line entry if the data block is maintained in that cache line entry to perform the data access request;

setting a first flag associated with the accessed cache line entry "on" if the data access request is a read request;

selecting one cache line that has its valid flag set "off" if the requested data block is not maintained in any cache line entry;

fetching consecutive data blocks from the memory including the requested data block if that requested data block is not maintained in any cache line entry;

writing the fetched consecutive data blocks to the selected cache line;

receiving a request to allocate one cache line if no cache line has the valid flag set "off"; and selecting one cache line to allocate to the request having each first flag set "on" and each second flag set "off".

31. The article of manufacture of claim 30, further causing the processor to perform:

selecting one cache line having each first flag set "on" and each second flag set "on" if there is no cache line having each first flag set "on" and each second flag set "off"; and flushing entries in the selected cache line having their second flag set "on".

32. The article of manufacture of claim 31, further causing the processor to perform selecting one cache line having each first flag set "off" and each second flag set "on" if there is no cache line having each first flag set "on".

33. The article of manufacture of claim 32, wherein at least two cache lines are allocated to store data blocks in a circular buffer, wherein one cache line includes one data block adjacent to the head pointer and another cache line includes one data block adjacent to the tail pointer.

* * * * *